A. JAMES.
VEHICLE WHEEL.
APPLICATION FILED MAR. 2, 1911.
1,002,154.
Patented Aug. 29, 1911.
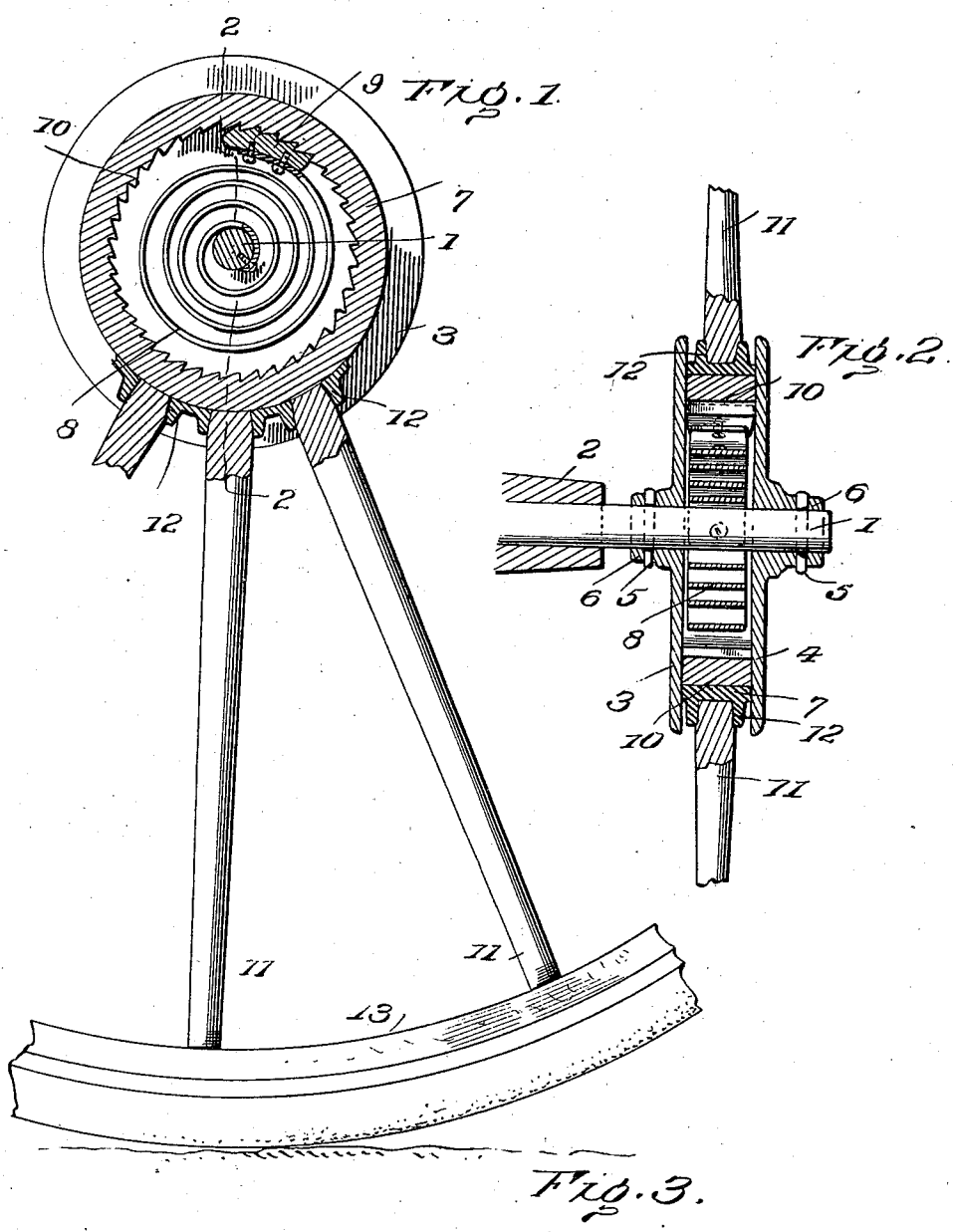
Witnesses
Edna N. Thomas
Chas. C. Richardson
Inventor
A. James
By Wm. C. McIntire
Attorney

UNITED STATES PATENT OFFICE.

ALLEN JAMES, OF CAPLE, OKLAHOMA.

VEHICLE-WHEEL.

1,002,154. Specification of Letters Patent. Patented Aug. 29, 1911.

Application filed March 2, 1911. Serial No. 611,818.

*To all whom it may concern:*

Be it known that I, ALLEN JAMES, a citizen of the United States, residing at Caple, in the county of Texas and State of Oklahoma, have invented certain new and useful Improvements in Vehicle-Wheels; and I do hereby declare the following to be a full, clear, and exact description of the invention, such as will enable others skilled in the art to which it appertains to make and use the same.

This invention relates to new and useful improvements in vehicle wheels, and particularly that type in which a spring is used to furnish the necessary resiliency for comfort in riding.

The invention has for its object the elimination of the expensive rubber tires to furnish the proper resiliency to motor cars, or any other type of pleasure vehicles.

The device further provides a simple, inexpensive and easily manufactured wheel that eliminates the uncertainty and complication of spring wheels.

Still another advantage is the ease with which it may be assembled or taken apart to adjust for varying road conditions or loads.

With the above and other objects in view, this invention resides in the novel features of construction, formation, combinations and arrangement of parts to be hereinafter more fully described, claimed and illustrated in the accompanying drawing, in which—

Figure 1 is a sectional side elevation of my invention; Fig. 2 is a transverse section view taken on the line 2—2 of Fig. 1, and Fig. 3 is a detail perspective view of the shoe.

Referring to the drawing by characters of reference the numeral 1 represents the driving axle of a motor car, extending out through a suitable bearing 2, on which is supported the frame of the machine. The outer end of the axle is cut flat on one side to receive and cause to rotate with it the two disks 3 and 4. These disks are secured at the proper distance apart by the pins 5, passing through the axle of the shoulders 6, formed on the disks. The ring 7 placed between the disk 3 and 4 is of sufficient diameter to leave a space between it and the axle for the insertion of a substantial coil spring 8, the inner end of the spring is secured to the axle, while its outer end is riveted to a shoe 9, provided on its outer face with teeth to engage with the notches 10, cut in the inner surface of the ring 7. Spokes 11 are secured by some suitable means as the sockets 12 to the outer periphery of the ring 7, a rim 13 being mounted on their ends.

It will be seen from the foregoing description that when the axle is caused to rotate, the spring will have a tendency to coil up and thus carry with it the shoe 9, which in turn causes the wheel to rotate. This spring should be of substantial design to support the weight of the vehicle, and yet furnish sufficient resiliency to provide comfort to the passengers of the vehicle. The notches 10 cut in the inner face of the ring 7 must necessarily be so inclined that when the axle pulls the shoe 9, the shoe will be retained against the notches thereby turning the ring. The notches are further provided so that the shoe may be placed at any desired position within the ring, thereby increasing or decreasing the tension on the spring, and consequently providing adjustment for varying loads and road conditions.

Having thus fully described my invention, what I claim as new and desire to protect by Letters Patent is:

In a spring wheel such as described, an axle, a ring spaced from said axle, internally cut teeth formed on the inner face of said ring, an outer rim, spokes connecting said ring with said outer rim, disks, each having a shoulder secured to said axle, said ring adapted to slide between said disks, a coil spring mounted between said axle and said ring, one end of which is secured to said axle, a shoe provided with teeth mounted on the opposite end of said coil spring, the said teeth on said shoe adapted to engage said internally cut teeth formed on said ring when the said axle is rotated to rotate said wheel.

In testimony whereof I affix my signature in presence of two witnesses.

ALLEN JAMES.

Witnesses:
W. S. MYERS,
T. BRINKLEY.

Copies of this patent may be obtained for five cents each, by addressing the "Commissioner of Patents, Washington, D. C."